(12) United States Patent
Ertemalp

(10) Patent No.: US 7,653,063 B2
(45) Date of Patent: Jan. 26, 2010

(54) SOURCE ADDRESS BINDING CHECK

(75) Inventor: Fusun Ertemalp, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 397 days.

(21) Appl. No.: 11/650,158

(22) Filed: Jan. 5, 2007

(65) Prior Publication Data

US 2008/0165778 A1 Jul. 10, 2008

(51) Int. Cl.
*H04L 12/56* (2006.01)

(52) U.S. Cl. .................... 370/392; 370/331

(58) Field of Classification Search .......... 370/331, 370/395, 392, 338; 709/220, 245
See application file for complete search history.

(56) References Cited

U.S. PATENT DOCUMENTS

| | | | |
|---|---|---|---|
| 5,247,638 A | | 9/1993 | O'Brien et al. |
| 6,339,595 B1* | | 1/2002 | Rekhter et al. ............... 370/392 |
| 6,781,990 B1 | | 8/2004 | Puri et al. |
| 6,967,949 B2* | | 11/2005 | Davis et al. ................ 370/390 |
| 7,321,926 B1* | | 1/2008 | Zhang et al. ................ 709/220 |
| 7,346,057 B2* | | 3/2008 | Foschiano et al. ............ 370/392 |
| 7,420,973 B2* | | 9/2008 | Becker Hof et al. .......... 370/392 |
| 7,492,763 B1* | | 2/2009 | Alexander, Jr. .............. 370/389 |
| 2003/0093563 A1* | | 5/2003 | Young et al. ................. 709/245 |
| 2003/0193912 A1* | | 10/2003 | O'Neill ....................... 370/331 |
| 2004/0202183 A1* | | 10/2004 | Thubert et al. .......... 370/395.31 |
| 2006/0150172 A1* | | 7/2006 | Heath et al. ................. 717/162 |
| 2006/0198349 A1* | | 9/2006 | Ng et al. ..................... 370/338 |
| 2007/0054741 A1* | | 3/2007 | Morrow et al. ................ 463/42 |

* cited by examiner

*Primary Examiner*—Thong H Vu
(74) *Attorney, Agent, or Firm*—Michael C. Stephens, Jr.; Trellis IP Law Group, PC

(57) ABSTRACT

In one embodiment, a method can include: (i) receiving a packet in a switch, where the packet includes a plurality of fields that forms a binding; (ii) performing a first lookup of a first table using a first lookup key, where the first lookup key includes a first subset of the plurality of fields; (iii) performing a second lookup of a second table using a second lookup key, where the second lookup key includes a result of the first lookup and a second subset of the plurality of fields; and (iv) indicating a check of the binding by using a result of the second lookup. The plurality of fields can include a media access control (MAC) source address, an internet protocol (IP) address, a receive port, and a receive virtual local area network (VLAN), while the result of the first lookup can include a layer-2 source index, for example.

20 Claims, 7 Drawing Sheets

SOURCE ADDRESS BINDING CHECK

TECHNICAL FIELD

The present disclosure relates generally to security features in switches and, more specifically, to techniques for checking a source address binding.

BACKGROUND

Today's switch/routers can support dynamic host configuration protocol (DHCP) snooping and internet protocol (IP) source guard. With DHCP snooping, a switch can learn and keep the "binding" of fields, such as {media access control (MAC) source address, receive port, receive virtual local area network (VLAN)}, and validate DHCP messages. IP source guard can check that packets coming from a particular port have a valid IP address assigned by DHCP, thus protecting against IP address snooping.

However, for stronger detection of mis-configuration and/or potential network attacks, the entire address binding consisting of {MAC source address, IP source address, receive port, receive VLAN} should be checked. Such a stronger check can ensure that a packet received from a port and VLAN contains expected IP and MAC addresses. Further, the entire address binding should be checked for cases where multiple hosts exist in a system (e.g., due to a hub or another switch between the host and the switch) to ensure a full binding check.

DESCRIPTION OF EXAMPLE EMBODIMENTS

Figure 1:
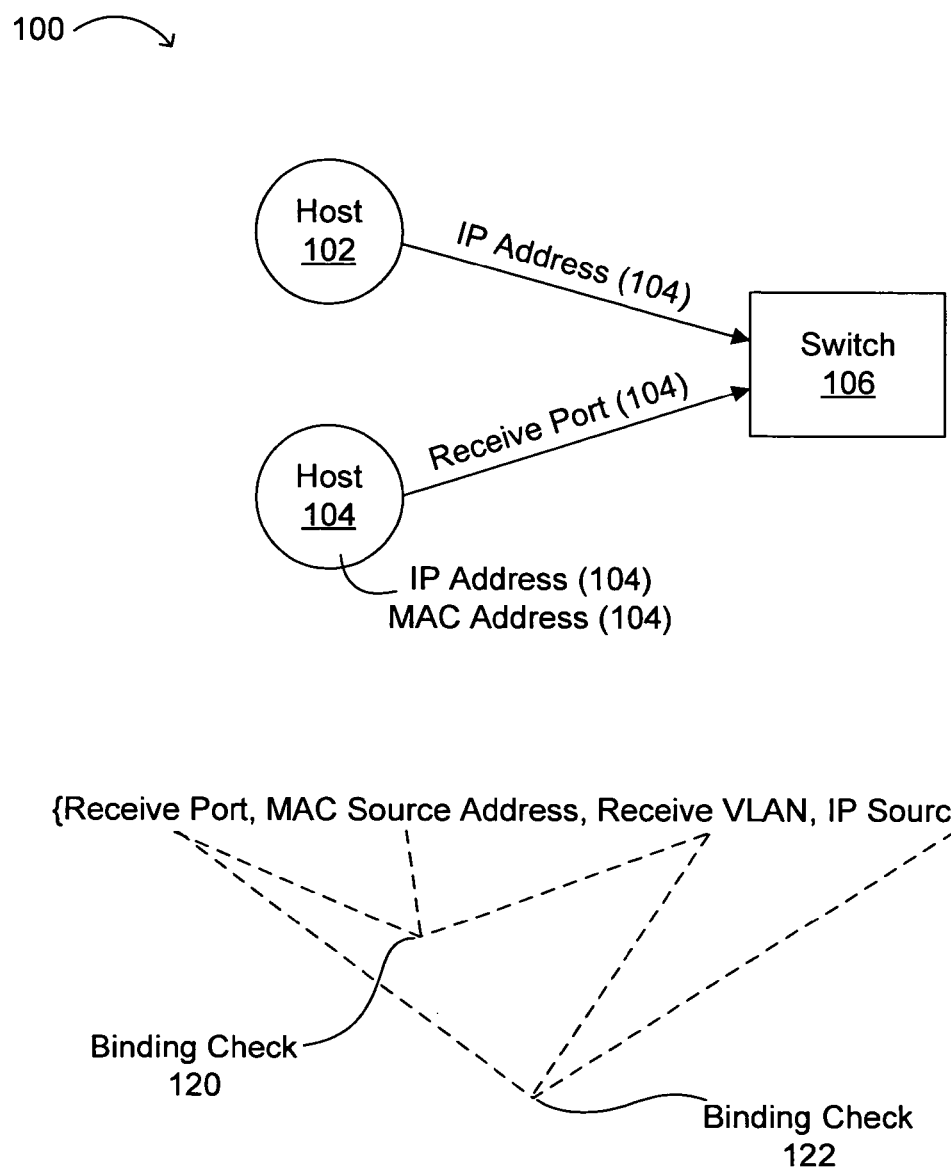
FIG. 1 illustrates an example host and switch arrangement with a conventional implicit binding check approach.

Particular embodiments can generally provide a source address binding check approach that is more efficient in terms of the number of bits checked, as compared to corresponding conventional approaches.

Overview

In one embodiment, a method can include: (i) receiving a packet in a device, such as a switch, where the packet or a port receiving the packet includes a plurality of fields that form a binding; (ii) performing a first lookup of a first table using a first lookup key, where the first lookup key includes a first subset of the plurality of fields; (iii) performing a second lookup of a second table using a second lookup key, where the second lookup key includes a result of the first lookup and a second subset of the plurality of fields; and (iv) indicating a check of the binding by using a result of the second lookup.

The plurality of fields or binding can include a media access control (MAC) source address, an internet protocol (IP) address, a receive port, and a receive virtual local area network (VLAN), while the result of the first lookup can include a layer-2 source index, for example.

In one embodiment, a system can include a host coupled to a device, such as a switch, where the host can provide to the switch a packet with a plurality of fields that can form a binding, where the switch can include first and second tables, and where: (i) the first table is configured to support a first lookup with a first lookup key, where the first lookup key includes a first subset of the plurality of fields; and (ii) the second table is configured to support a second lookup with a second lookup key, where the second lookup key includes a result of the first lookup and a second subset of the plurality of fields, and where the second table is configured to provide a result of the second lookup for indicating a check of the binding.

In one embodiment, an apparatus can include: (i) an input port configured to receive a packet with a plurality of fields, where the plurality of fields can form a binding; (ii) a first table configured to support a first lookup with a first lookup key, where the first lookup key includes a first subset of the plurality of fields; and (iii) a second table configured to support a second lookup with a second lookup key, where the second lookup key includes a result of the first lookup and a second subset of the plurality of fields, and where the second table can provide a result of the second lookup for indicating a check of the binding.

Example Embodiments

Particular embodiments can provide an enhancement of existing security features, attained by checking for a plurality of fields that can form a binding of {MAC source address, IP source address, receive port, receive VLAN}, for example. Accordingly, even if a switch has multiple hosts connected to a port and/or VLAN, the switch can perform such a full binding check for each received packet. Of course, other combinations of fields and/or bits that may form any other suitable "bindings" can also be checked in particular embodiments.

Advantages of particular embodiments can include a switch being able to perform a robust or full source address binding check for packets received, even when the switch is connected indirectly to multiple hosts on a same port and/or VLAN. Further, such binding checks can be performed in a cost-effective manner and may protect against address spoofing attacks and/or mis-configurations, for example.

Referring now to FIG. 1, an illustration of an example host and switch arrangement with an implicit binding check approach is indicated by the general reference character 100. Hosts 102 and 104 can connect to switch 106, for example. A host (e.g., host 104) can provide an internet protocol (IP) address, a media access control (MAC) address, and a receive port indication to switch 106. In the particular example shown in FIG. 1, a security concern and/or a mis-configuration of host 102 can result in an IP address of host 104 being sent via a connection (e.g., a port) intended for host 102. A binding check can be performed to determine such problems and to prevent further access to switch 106 for a given packet, for example. Accordingly, IP address (104), as supplied by host 102 may fail a binding check performed in switch 106 and associated packets may not be forwarded as a result.

In performing a typical binding check, a {MAC source address, receive port, receive VLAN (virtual local area network)} binding can be checked (e.g., binding check 120) via a layer-2 source lookup in switch 106. In addition, the {IP (source) address, receive port, receive VLAN} binding can be checked (e.g., binding check 122) using an IP classification entry (e.g., an access control list (ACL) lookup mechanism). Accordingly, fields of MAC source address, receive port, receive VLAN, and IP source address, can form various "bindings" or field arrangements to be checked for packet verification and/or security. Further, switch 106 can learn address bindings by dynamic host configuration protocol (DHCP) snooping, by configuration, or by other address assignment protocols, for example.

When only one host is connected to a receive port (e.g., only host 104), then binding checks 120 and 122 can implicitly check all fields forming the full {MAC source address, IP source address, receive port, receive VLAN} binding. However, if there are multiple hosts (e.g., hosts 102 and 104) on a same port and/or VLAN, binding checks 120 and 122 may not provide a full binding check for a {MAC source address, IP source address, receive port, receive VLAN} binding. As a result, the security and/or mis-configuration problems discussed above can arise due to an insufficient binding check. Further, such problems can also exist where another switch is inserted in an arrangement between a single host and switch, for example.

Figure 2:
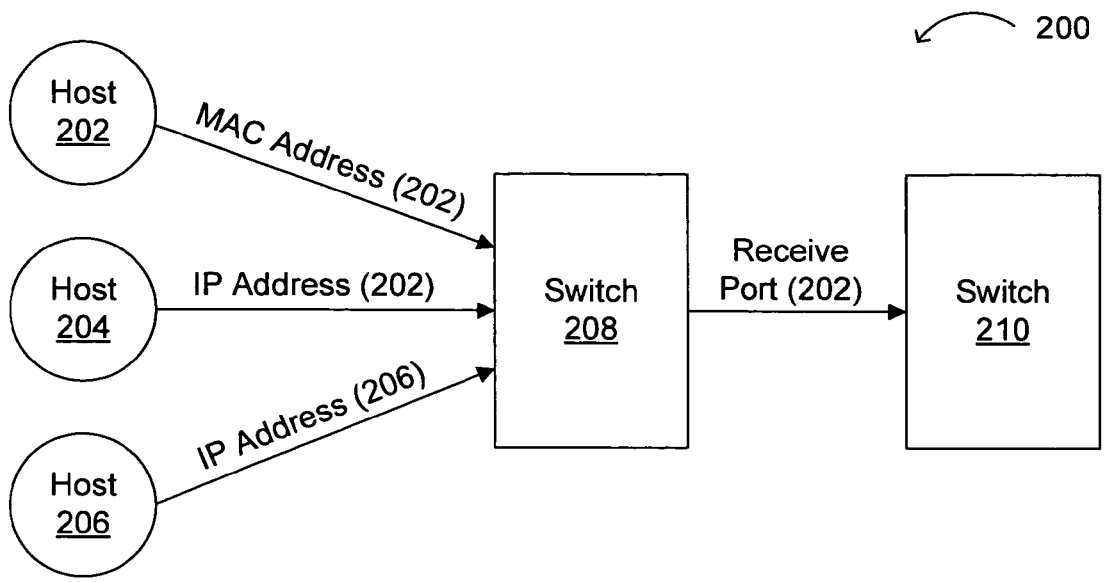
FIG. 2 illustrates an example multiple host and multiple switch arrangement.

Referring now to FIG. 2, an illustration of an example multiple host and multiple switch arrangement is indicated by the general reference character 200. Hosts 202, 204, and 206 can connect or interface (e.g., via input ports) with switch 208. In this particular example, all hosts shown connected to switch 208 may be in a same VLAN. Switch 210 can interface with switch 208, which can provide a receive port (202) indication. In this particular example, host 202 can provide a correct MAC address (202) and Host 206 can provide a correct IP address (206). However, host 204 may provide an incorrect or unrecognized IP address (202).

Switch 210 can verify the binding of the multiple hosts (e.g., 202, 204, and 206) on a given port even when switch 208 is not performing a binding check. In this particular example, host 204 is attempting to send an incorrect IP address (202), and this can be detected by a full binding check performed in switch 208.

Any source binding check failure can be a potential security or possibly a functional concern, such as a mis-configuration. For example, a mis-configuration can be where a VLAN configuration has been changed in a system or where a host or a switch is not recognizing a correct VLAN (e.g., not the expected VLAN). In particular embodiments, where there are multiple ports and/or switches, a robust binding check system can check for all fields of a binding in each switch. Further, such an approach, while advantageous for multiple host systems, can also work for single host systems. Also, packets that fail source binding check can be dropped or sent to a switch control processor for further inspection or logging, for example.

Figure 3:
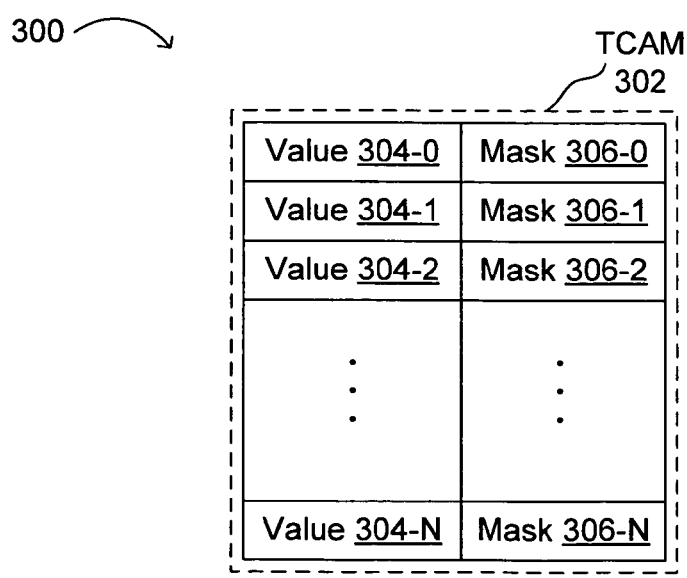
FIG. 3 illustrates an example ternary content addressable memory (TCAM).

Referring now to FIG. 3, an illustration of an example ternary content addressable memory (TCAM) is indicated by the general reference character 300. TCAM 302 can include an array of values with associated mask bits. For example, TCAM 302 can include value 304-0, value 304-1, value 304-2, and so on through value 304-N. Associated masks can include mask 306-0, mask 306-1, mask 306-2, and so on through mask 306-N. Each mask can have the same number of bits as each corresponding value entry. In addition each "value" can include any suitable number of fields or bits for comparison against a "key" in a lookup operation.

In operation, a lookup of TCAM 302 can include a comparison of a lookup key (not shown) to each entry value and entry mask (e.g., to each of value 304-0, 304-1, 304-2, . . . 304-N and corresponding masks 306-0, 306-1, 306-2, . . . 306-N). In particular embodiments, TCAM 302 can also be used as a classification table (e.g., for transmission control protocol (TCP) information, such as IP source address, IP destination address, IP protocol, layer-4 source port, and/or layer-4 destination port). A classification table can match a lookup key to within a given range of values, which may define a particular "class." Such a classification approach can be used to deny or permit forwarding to a particular port, or police to a particular rate, for example. Further, a plurality of fields in a binding can be checked in a single lookup or using multiple lookups of a table (e.g., TCAM 302), for example.

Figure 4:
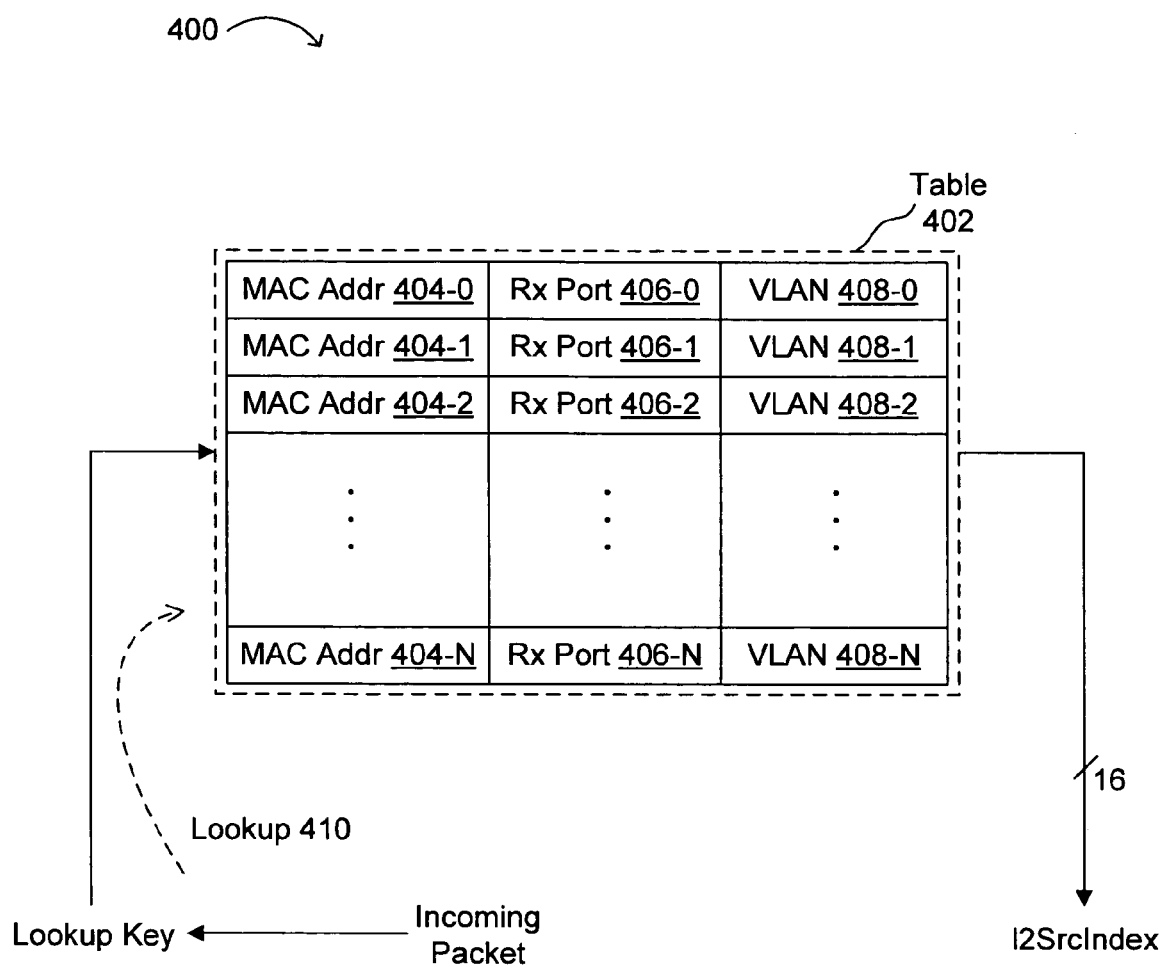
FIG. 4 illustrates an example layer-2 forwarding table or media access control (MAC) table.

Referring now to FIG. 4, an illustration of an example layer-2 forwarding table or media access control (MAC) table is indicated by the general reference character 400. Table 402 can be formed in a TCAM, a CAM, or a hash table (e.g., organized as "buckets"), to name just a few examples. A static random access memory (SRAM) can be configured as a hash table, for example. Of course, other suitable types and/or configurations of hardware memory can be utilized in particular embodiments. In the particular example of FIG. 4, table 402 can include MAC addresses (Addr) 404-0, 404-1, 404-2, and so on through 404-N, corresponding receive (Rx) port entries 406-0, 406-1, 406-2, and so on through 406-N, and corresponding VLAN entries 408-0, 408-1, 408-2, and so on through 408-N.

For an incoming packet received in a switch, a "subset" of fields that can form a binding may be used in a lookup. For example, a subset of fields for lookup 410 can include a MAC source address field, a receive port field, and a VLAN field. A lookup based on a MAC source address field can be used to determine whether the packet is coming from a same or an otherwise appropriate port. For example, if a host has moved, the next source address can be determined to identify the expected port, or the correct port information can be otherwise learned.

Lookup 410 can include receiving an incoming packet and performing a lookup using a key including the MAC source address field of the packet. If a match (e.g., a hit) is found in table 402, a determination may then be made as to whether the hit is coming from the same or an appropriate port. A result of a "hit" or match condition in the table can be provided as the address of a matching source MAC address entry in table 402, referred to here as l2SrcIndex, for example. Further, the field l2SrcIndex can be 16-bits when a corresponding MAC lookup table includes 64K entries, for example. Accordingly, here l2SrcIndex can be an address of a matching lookup table 402 entry, so l2SrcIndex can uniquely identify a {MAC Addr, Rx Port, VLAN} triple.

Further, in a switch with layer 2 switching functionality, an included layer-2 lookup table can store {MAC source address, receive port, receive VLAN}, so no additional resources may be needed. The matching entry address, l2SrcIndex, may then be used together with an IP address to do an address binding check. Accordingly, such a {l2SrcIndex, IP source address} check may essentially be equivalent to checking the four values, {MAC source address, receive port, receive VLAN, IP source address}, substantially simultaneously, but with reduced costs (e.g., less storage space).

A binding check in particular embodiments can include one or more of three approaches: (i) a lookup in a classification CAM; (ii) a lookup using an address database with associative data; and (iii) use of an IP lookup database, such as a forwarding information base (FIB). Such approaches can be associated with a first lookup table, such as table 402 of FIG. 4, and/or a subsequent lookup table that may use 12SrcIndex as a lookup key, for example.

Figure 5:
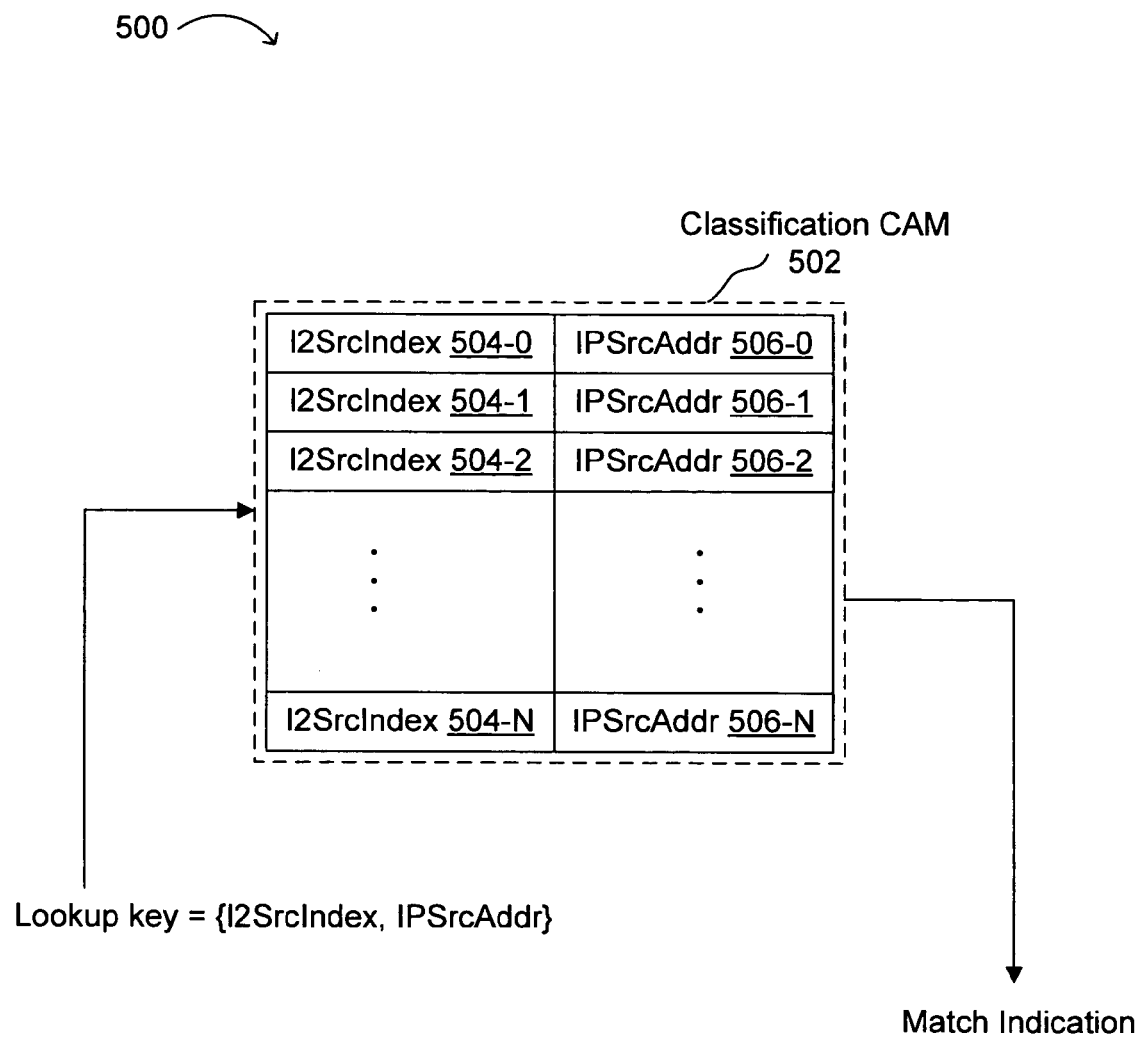
FIG. 5 illustrates an example lookup in a classification CAM.

Referring now to FIG. 5, an illustration of an example lookup in a classification CAM is indicated by the general reference character 500. In the particular example of FIG. 5, {12SrcIndex, IPSrcAddr} can be used as a lookup key in classification CAM 502. Classification CAM 502 can include entries 12SrcIndex 504-0, 504-1, 504-2, and so on through 504-N, as well as corresponding entries IPSrcAddr 506-0, 506-1, 506-2, and so on through 506-N. In one example, these address binding check entries can be programmed in an input classification table (e.g., classification CAM 502) of a switch as an access control list (ACL). Accordingly, a result (e.g., 12SrcIndex) of another lookup (e.g., lookup 410 of FIG. 4) can be used along with a subset of the fields in a binding (e.g., IPSrcAddr) as a lookup key for table 502.

The layer-2 lookup source entry can be found by mapping from {MAC source address, receive port, receive VLAN}, as discussed above. For example, if the address of the layer-2 source lookup entry is "12SrcIndex," the MAC address/IP address binding check can then use 12SrcIndex to perform the check on {12SrcIndex, IP source address} instead of using {MAC source address, receive port, receive VLAN}. Accordingly, advantages of particular embodiments can include a resulting significant savings in the number of bits to be checked to perform a full binding check by utilizing a form of compaction.

For example, in a 512-port switch, the binding of {MAC source address, receive port, receive VLAN} can be 69-bits. The 69-bits can include a 48-bit MAC address, 12-bits of receive VLAN, and 9-bits of receive port. Even if the receive port and receive VLAN are first mapped to a smaller internal input interface ID, such as a 14-bit ID to support 16K total interfaces, the total for checking remains 62-bits in this example. Thus, checking against the 48-bit MAC source address can be a relatively expensive portion. In contrast, if the switch is supporting 64K layer-2 lookup entries, then 12SrcIndex can be only 16-bits, significantly reducing the number of bits to be checked.

Figure 6:
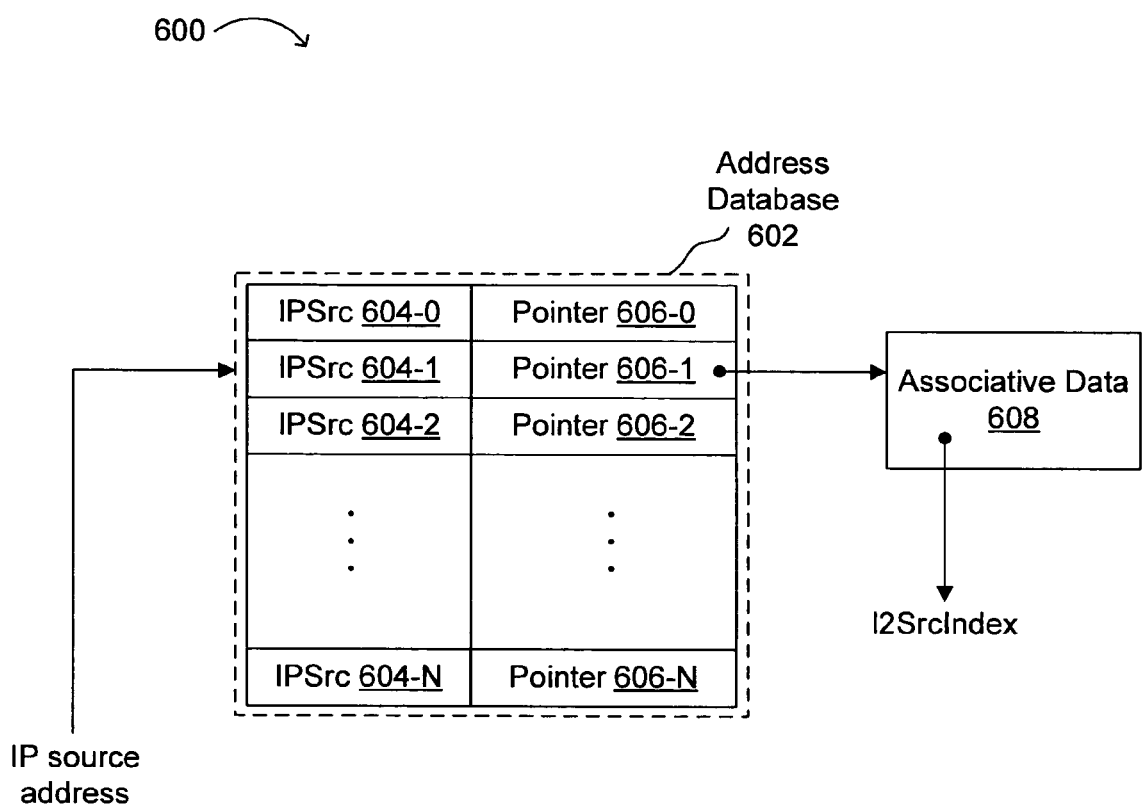
FIG. 6 illustrates an example address database with associative data.

Referring now to FIG. 6, an illustration of an example address database with associative data is indicated by the general reference character 600. Address database 602 can include entries IP source address (IPSrc) 604-0, 604-1, 604-2, and so on through 604-N, as well as corresponding pointers 606-0, 606-1, 606-2, and so on through 606-N. Here, an IP source address can be looked-up in an IP address database (e.g., address database 602). A pointer from a matching entry (e.g., pointer 606-1) can access associative data 608 of the matching entry and may return the expected 12SrcIndex, for example. Alternatively, associative data 608 can return the expected triple {MAC source address, receive port, receive VLAN}. Such can be programmed as an ACL with lookup result data returning 12SrcIndex, for example.

In one embodiment, a binding check can be programmed in an IP lookup database, such as a forwarding information base (FIB), or by programming the binding in a flow table, such as using a "netflow" feature, for example. Further, this check can be combined with a unicast reverse path filtering (RPF) check, used to reduce the risk of customers attacking other internet hosts, in an integrated switch/router, for example.

Figure 7:
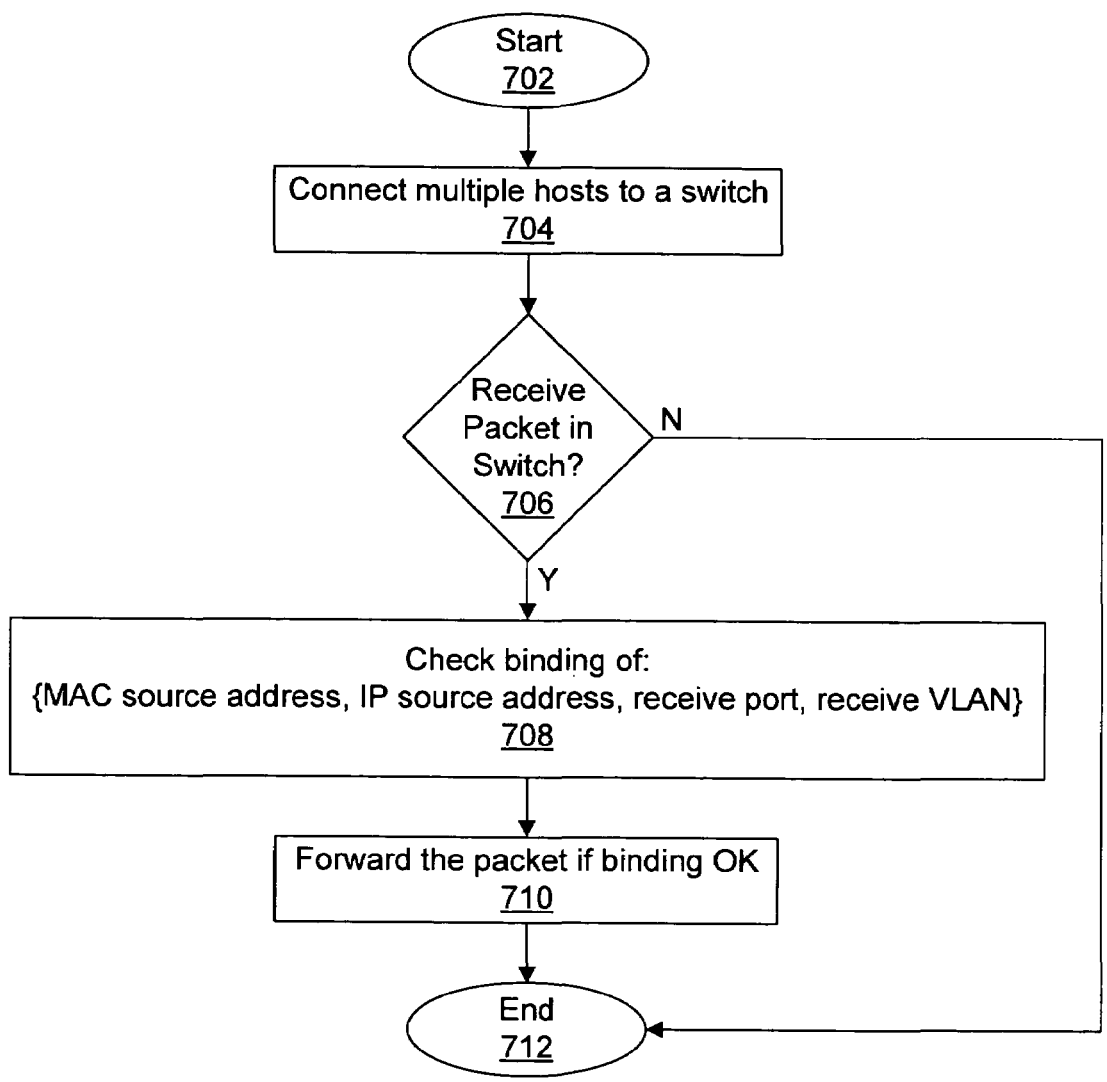
FIG. 7 illustrates a simplified flow chart of a general method of checking a binding.

Referring now to FIG. 7, a simplified flow chart illustration of a method of checking a binding is indicated by the general reference character 700. The flow can begin (702) and multiple hosts can be connected to a switch (704). Alternatively, another switch can be inserted in an arrangement between a single host and switch, for example. If no packets are received in a switch performing binding checks (706), the flow can complete (712).

Once a packet is received in the switch (706), the full binding of: {MAC source address, IP source address, receive port, receive VLAN} can be checked (708). For example, such a binding check can be performed using one or more of: a lookup in a classification CAM or TCAM; a lookup using an address database with associative data; and an IP lookup database. If the binding check shows an unacceptable result (i.e., no match), the packet can be dropped or a suitable error message may be generated. However, if the binding check is acceptable, the packet can be forwarded (710) to the appropriate destination port and the flow can complete (712).

Figure 8:
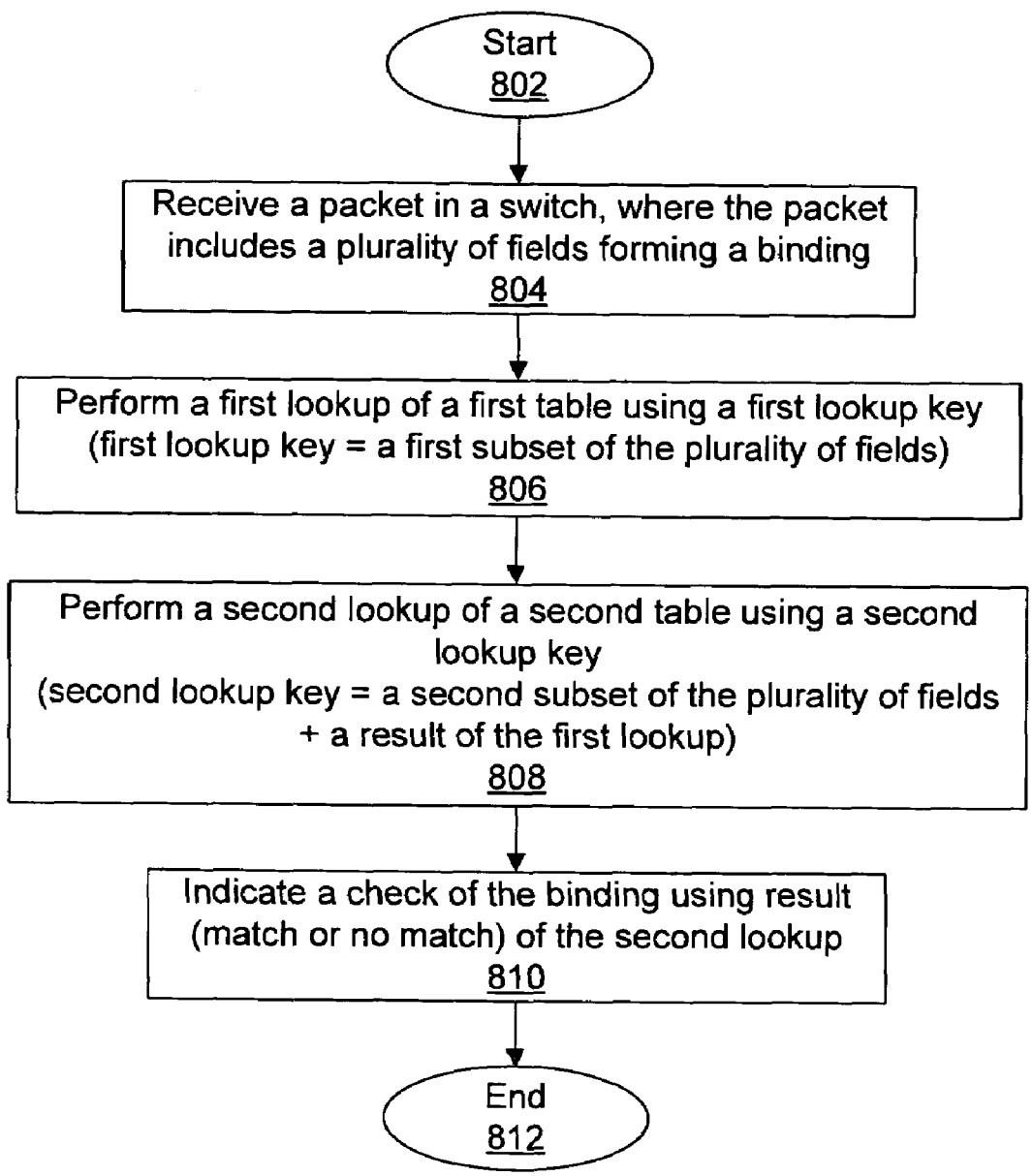
FIG. 8 illustrates a simplified flow chart of a method of checking a binding.

Referring now to FIG. 8, a simplified flow chart of an example method of checking a binding is indicated by the general reference character 800. The flow can begin (802) and a packet can be received in a switch, where the packet includes a plurality of fields forming a binding (804). Next, a first lookup of a first table using a first lookup key can be performed (806). In particular embodiments, the first lookup key can include a first subset of the plurality of fields. For example, the first lookup key can include a MAC source address, a receive port, and a receive VLAN.

A second lookup of a second table using a second lookup key can then be performed (808). In particular embodiments, the second lookup key can include a result of the first lookup (e.g., 12SrcIndex) and a second subset of the plurality of fields (e.g., IPSrcAddr). A check of the binding can be indicated by using a result (e.g., match or no match) of the second lookup (810), and the flow can complete (812).

Although a {MAC source address, IP source address, receive port, receive VLAN} full binding check is primarily described, it will be understood that other fields, combinations of fields, or other types of packet and/or port binding checks may be appreciated by persons skilled in the art. For example, any type of interface information or source addresses suitable for use in a binding or collection of fields for checking can be accommodated in particular embodiments. Further, other layers or other protocols (e.g., other than IPv4 or IPv6) and/or other hardware memory types can also be employed in particular embodiments. For example, in an MPLS router, an MPLS label can be bound to an interface where the interface may be a port of the router, to allow the filtering out of unexpected MPLS packets on an interface.

Although the invention has been described with respect to particular embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," "particular embodiments," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a particular embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Particular embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in particular applications. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" , and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:

receiving a packet in a switch, wherein the packet comprises a plurality of fields forming a binding, the binding comprising a media access control (MAC) source address field, an Internet protocol (IP) address field, a receive port field, and a virtual local area network (VLAN) field;

performing a first lookup of a first table using a first lookup key, wherein the first lookup key comprises a first subset of the plurality of fields;

performing a second lookup of a second table using a second lookup key, wherein the second lookup key comprises a result of the first lookup and a second subset of the plurality of fields; and indicating a check of the binding for the received packet using a result of the second lookup.

2. The method of claim 1, wherein the switch is coupled to a plurality of hosts, the packet being received from one of the plurality of hosts.

3. The method of claim 1, wherein:
the first subset of the plurality of fields comprises the MAC source address field, the receive port field, and the VLAN field; and
the second subset of the plurality of fields comprises the IP address field.

4. The method of claim 1, wherein the result of the first lookup comprises a layer-2 source index.

5. The method of claim 1, wherein a ternary content addressable memory (TCAM) comprises at least one of the first and second tables.

6. The method of claim 1, wherein a static random access memory (SRAM) configured as a hash table forms at least one of the first and second tables.

7. The method of claim 1, wherein a classification content addressable memory (CAM) comprises at least one of the first and second tables.

8. The method of claim 1, wherein at least one of the first and second tables comprises an address database.

9. A system, comprising:
a first host coupled to a switch, the first host being configured to provide to the switch a packet having a plurality of fields, the plurality of fields being configured to form a binding, the binding comprising a media access control (MAC) source address field, an Internet protocol (IP) address field, a receive port field, and a virtual local area network (VLAN) field, the switch having first and second tables, wherein:
the first table is configured to support a first lookup with a first lookup key, wherein the first lookup key comprises a first subset of the plurality of fields; and
the second table is configured to support a second lookup with a second lookup key, wherein the second lookup key comprises a result of the first lookup and a second subset of the plurality of fields, and wherein the second table is configured to provide a result of the second lookup for indicating a check of the binding for the packet.

10. The system of claim 9, further comprising a second host coupled to the switch.

11. The system of claim 9, wherein:
the first subset of the plurality of fields comprises the MAC source address field, the receive port field, and the VLAN field; and
the second subset of the plurality of fields comprises the IP address field.

12. The system of claim 9, wherein the result of the first lookup comprises a layer-2 source index.

13. The system of claim 9, wherein at least one of the first and second tables comprises an address database.

14. The system of claim 9, wherein a hardware memory comprises at least one of the first and second tables.

15. An apparatus, comprising:
an input port configured to receive a packet having a plurality of fields, the plurality of fields being configured to form a binding, the binding comprising a media access control (MAC) source address field, an Internet protocol (IP) address field, a receive port field, and a virtual local area network (VLAN) field;
a first table configured to support a first lookup with a first lookup key, wherein the first lookup key comprises a first subset of the plurality of fields; and
a second table configured to support a second lookup with a second lookup key, wherein the second lookup key comprises a result of the first lookup and a second subset of the plurality of fields, and wherein the second table is configured to provide a result of the second lookup for indicating a check of the binding for the received packet.

16. The apparatus of claim 15, wherein the packet is received at the input port from one of a plurality of hosts coupled to the input port.

17. The apparatus of claim 15, wherein:
the first subset of the plurality of fields comprises the MAC source address field, the receive port field, and the VLAN field; and
the second subset of the plurality of fields comprises the IP address field.

18. The apparatus of claim 15, wherein the result of the first lookup comprises a layer-2 source index.

19. The apparatus of claim 15, wherein a hardware memory comprises at least one of the first and second tables.

20. The apparatus of claim 15, wherein at least one of the first and second tables comprises an address database.

* * * * *

UNITED STATES PATENT AND TRADEMARK OFFICE
CERTIFICATE OF CORRECTION

| | | |
|---|---|---|
| PATENT NO. | : 7,653,063 B2 | Page 1 of 1 |
| APPLICATION NO. | : 11/650158 | |
| DATED | : January 26, 2010 | |
| INVENTOR(S) | : Fusun Ertemalp | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

Twenty-eighth Day of December, 2010

David J. Kappos
*Director of the United States Patent and Trademark Office*